(12) United States Patent
Okita et al.

(10) Patent No.: US 6,225,998 B1
(45) Date of Patent: *May 1, 2001

(54) VISUAL DESIGN OF WORKFLOWS FOR TRANSACTION PROCESSING

(75) Inventors: Glen K. Okita, San Jose; Suresh K. Agarwal; Yiu Man Chan, both of Sunnyvale; David T. McCalmont, San Jose; Robert A. Blatt, Palo Alto, all of CA (US)

(73) Assignee: Aspect Communications, San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/982,716

(22) Filed: Dec. 2, 1997

(51) Int. Cl.$^7$ .................................................. G06F 3/14
(52) U.S. Cl. ........................ 345/356; 345/335; 345/348; 707/102; 707/503
(58) Field of Search .................... 345/348, 342, 345/965, 967, 968, 335; 707/102, 503

(56) References Cited

U.S. PATENT DOCUMENTS

| | | | |
|---|---|---|---|
| 4,885,694 | * 12/1989 | Pray et al. | 345/352 |
| 5,214,756 | 5/1993 | Franklin et al. | |
| 5,301,301 | * 4/1994 | Kodosky et al. | 345/349 |
| 5,323,452 | * 6/1994 | Dickman et al. | 379/201 |
| 5,455,854 | 10/1995 | Dilts et al. | |
| 5,455,903 | * 10/1995 | Jolissaint | 345/348 |
| 5,533,110 | 7/1996 | Pinard et al. | |
| 5,576,946 | * 11/1996 | Bender et al. | 364/146 |
| 5,623,541 | 4/1997 | Boyle et al. | 379/136 |
| 5,649,131 | 7/1997 | Ackerman et al. | |
| 5,664,129 | 9/1997 | Futatsugi et al. | 345/339 |
| 5,734,837 | 3/1998 | Flores et al. | 705/7 |
| 5,742,814 | * 4/1998 | Balasa et al. | 707/102 |
| 5,754,636 | 5/1998 | Bayless et al. | |
| 5,799,297 | 8/1998 | Goodridge et al. | 707/1 |
| 5,832,611 | 11/1998 | Kennedy et al. | |
| 5,848,393 | 12/1998 | Goodridge et al. | 705/8 |
| 5,905,493 | 5/1999 | Belzer et al. | 345/334 |
| 5,918,226 | 6/1999 | Tarumi et al. | 707/10 |

* cited by examiner

*Primary Examiner*—Raymond J. Bayerl
*Assistant Examiner*—Thomas T. Nguyen
(74) *Attorney, Agent, or Firm*—Blakely, Sokoloff, Taylor & Zafman

(57) ABSTRACT

A system, method, and article of manufacture for displaying visual primitives of a transaction flow through a transaction processing system. A visual representation of a transaction flow containing visual primitives is accessed from a storage device by a digital computer. The digital computer is then used to display the visual primitives of the transaction flow an a visual display in a flexible manner. The visual primitives can be dynamically sized and may display properties of each visual primitive. Configuration information associated with the transaction flow is also shown on the visual display.

29 Claims, 12 Drawing Sheets

VISUAL DESIGN OF WORKFLOWS FOR TRANSACTION PROCESSING

FIELD OF THE INVENTION

The present invention relates generally to improvements in customer transaction processing systems, such as call processing equipment. More particularly, the invention relates to a method, apparatus, and article of manufacture for the visual design of transaction flows.

BACKGROUND OF THE INVENTION

During recent years, automated transaction processing systems (e.g., telephone call processing systems) have increased in power and flexibility. Processing systems that are designed to aid direct telephone marketing or other telephone-based service providers have changed the configuration of physical sites. Previously, human agents at a single physical site handled inbound and outbound calls with minimal automation of agent and remote customer transactions. Today, many physical sites have been replaced by a virtual site which may be networked to multiple physical call centers that employ home and in-office workers who initiate and respond to remote customer transactions over different media, while creating and using a large amount of business-specific information.

The transformation of physical call center sites into virtual sites changes the type of business applications that users or developers must create and maintain. Originally, writing a business application for a call router consisted of defining call routing tables for a single site. Each routing table defines a workflow for describing how telephone calls and other transactions are distributed to agents, commonly referred to as automatic call distribution. Today, a business application can span multiple sites, employing distributed workflows that require the coordination of geographically distributed routing tables. Multiple software tools may be used to create various components of such systems. Because different users have different transaction flow requirements, the system for each user may become a confusing mosaic of interdependent applications, each created and maintained by different software tools. Multiple software tools may increase the difficulty in coordinating workflows across distributed execution environments, increase application development time, increase lifecycle maintenance costs, and increase the time required to make changes and enhancements to such systems.

In existing systems, generation of routing tables or routing procedures to control transaction flows requires computer programming skills. Additionally, specific training is generally required to learn how to generate routing tables. This specialized knowledge and training is required both to generate routing tables and to edit or modify existing routing tables.

Therefore, there is a need to minimize potential confusion caused by the use of multiple software tools and simplify the generation of workflow definitions (such as routing tables or routing procedures). There is a further need to coordinate workflows across distributed execution environments, reduce application development time, decrease life cycle maintenance costs, and decrease the time required to make changes to such systems.

SUMMARY OF THE INVENTION

The present invention provides a system, method, and article of manufacture for displaying visual primitives of a transaction flow used by a transaction processing system. An embodiment of the invention accesses a visual representation of a transaction flow containing visual primitives from a storage device contained in a digital computer. The digital computer is then used to display the visual primitives of the transaction flow on a visual display in a manner that provides for unrestricted placement of visual primitives.

One embodiment of the invention groups various elements of the transaction flow into sets.

Another embodiment of the invention dynamically sizes the visual primitives of the transaction flow.

Other embodiments of the invention display properties of the visual primitives and transaction flow configuration information using the visual display.

In particular embodiments of the invention, the visual primitives are organized into a plurality of libraries.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following description of the invention, reference is made to the accompanying drawings which form a part hereof, and in which is shown by way of illustration a specific embodiment in which the invention may be practiced. It will be understood that other embodiments may be utilized and structural changes may be made without departing from the scope of the present invention. A particular embodiment of the present invention, described below, enables a remote computer system user to execute a software application on a network file server.

The present invention provides a single transaction routing tool that coordinates workflows across distributed execution environments, reduces application development time, decreases life cycle maintenance costs, and decreases the time required to make changes to such systems. The present invention includes a graphical application workflow editor that simplifies the creation and modification of application workflows, and reduces the time required to create business applications. The present invention also provides a flexible system for creating, modifying, and displaying workflows by permitting unrestricted placement of workflow objects (e.g., steps, connections, and labels), as discussed below.

The application workflow editor of the present invention provides a graphical user interface for building applications. Applications are represented as a series of steps or procedures (referred to as "workflows", "transaction flows", or "call flows"). The use of a standard user interface reduces the amount of time required to program new types of applications. Furthermore, the graphical user interface is easier to interpret than scripting languages or textual listings of steps or procedures. The graphical representation of a workflow also provides better documentation for the workflow by graphically illustrating the various steps in the workflow and connections between the steps.

A transaction processing system may handle any type of transaction (both inbound and outbound), including telephone calls, facsimile transmissions, electronic mail, video sessions or Internet sessions. Particular embodiments of the invention refer to a call processing system, a call center, or an automatic call distributor (ACD) for purposes of explanation. However, the present invention can be used with any type of transaction processing system. Transaction processing systems can perform various functions, including receiving, transmitting, storing, queuing, and routing transactions. A transaction processing system may also handle mixed transactions (e.g., receive a telephone call and respond to the call using electronic mail).

Hardware Environment

Figure 1:
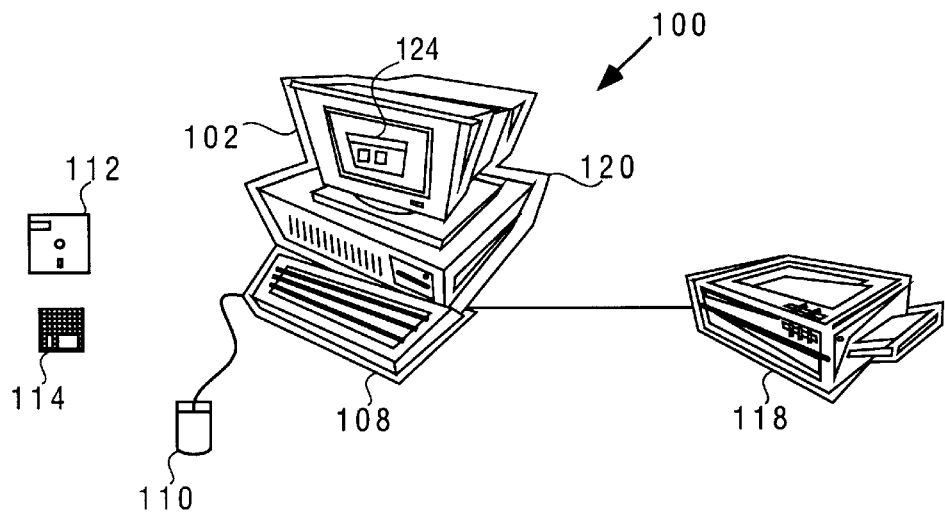
FIG. 1 is a system diagram that shows a computer hardware environment compatible with the present invention.

FIG. 1 shows an embodiment of a computer hardware environment that may be used with the present invention. The present invention can be implemented using a computer 100, wherein computer 100 includes a processor, a random access memory (RAM), and a read-only memory (ROM) and/or other components. Computer 100 may be coupled to various I/O devices, such as a monitor 102, a keyboard 108, a pointing device 110, fixed and/or removable data storage devices 112 and 114, and a printer 118. Monitor 102 can be any type of display device capable of displaying information to a user of the computer system. Keyboard 108 can be any type of user input device, such as a keyboard-based device, a handwriting recognition system, or a voice recognition system. Pointing device 110 can be a mouse, touch pad, track ball, light pen, or any other device capable of moving a cursor on a computer display device. Computer 100 may also be coupled to other I/O devices, including a local area network (LAN) or wide area network (WAN) via an interface cable 120. Those of ordinary skill in the art will recognize that any combination of the above components, or any number of different components, peripherals, and other devices, may be used with computer 100. Computer 100 may be a general purpose computer or a computer specifically designed for use with a transaction processing system.

Generally, computer 100 operates under the control of an operating system. An embodiment of the present invention is implemented using one or more computer programs or applications, which are represented by a window 124 displayed on monitor 102. Various computer programs and applications operate under the control of the operating system. The operating system and computer programs are loaded from a data storage device (such as a hard disk drive, diskette, or CD-ROM) into the memory of computer 100 for use during actual operations. Alternatively, the operating system or computer programs may be retrieved or downloaded from a remote system (such as a server).

In a particular embodiment of the invention, the operating system and the computer program are embodied in a computer-readable medium, such as data storage devices 112 and/or 114 which could include one or more fixed or removable data storage devices, such as a floppy disk drive, hard drive, CD-ROM drive, tape drive, etc. Further, the operating system and the computer programs include instructions which, when read and executed by computer 100, causes computer 100 to perform the steps necessary to implement or utilize the present invention. It will be appreciated that various modifications may be made to this configuration, including the number, size, and types of components, without departing from the scope of the invention.

A method and apparatus for editing visual primitives of a workflow (also referred to as a transaction flow) are described. The use of "transaction flow" or "workflow" herein shall be understood to include any flow (or subflow) of steps or procedures used in a transaction processing system. Furthermore, the terms "transaction flow" and "workflow" are used interchangeably herein. In the following description, for purposes of explanation, numerous specific details are set forth in order to provide a thorough understanding of the present invention. It will be evident, however, to one of ordinary skill in the art that the present invention may be practiced without these specific details. In other instances, well-known structures and devices are shown in block diagram form in order to facilitate description.

In one embodiment, steps and procedures according to the present invention are embodied in machine-executable software instructions, and the present invention is carried out in a processing system by a processor executing the instructions, as will be described in greater detail below. In other embodiments, hardwired circuitry may be used in place of, or in combination with, software instructions to implement the present invention.

System Organization

Figure 2:
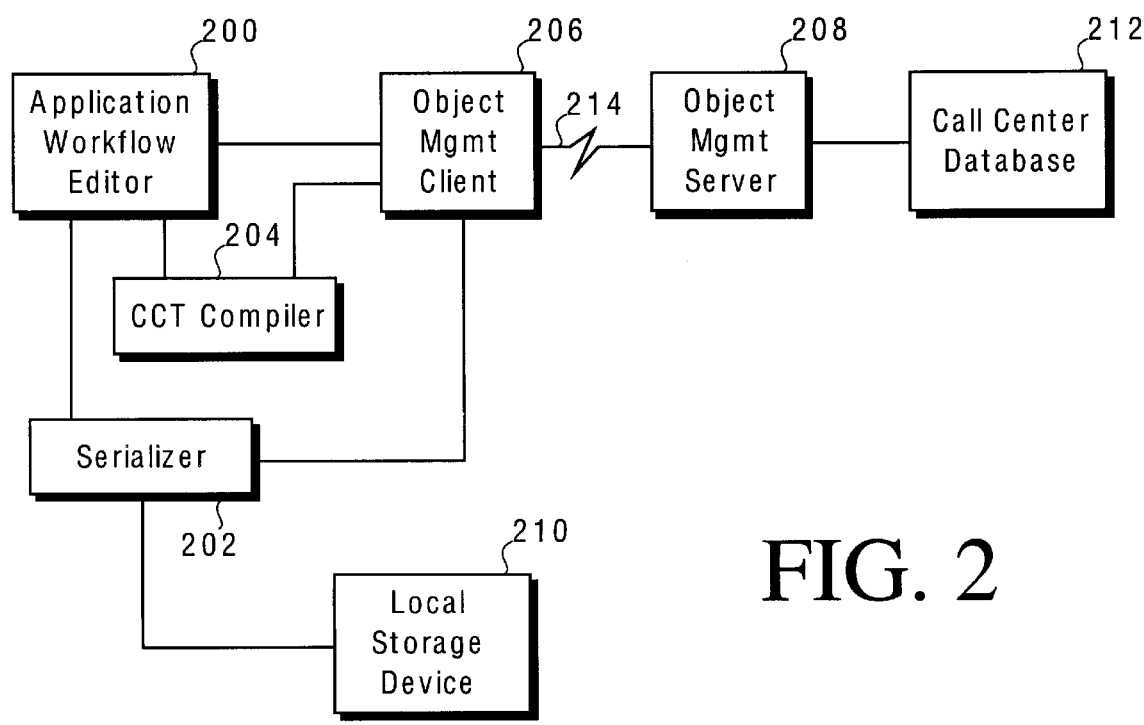
FIG. 2 is a system diagram that shows a system architecture compatible with the present invention.

FIG. 2 shows a diagram of an exemplary organization of a transaction processing system that can be used with the present invention. However, it will be appreciated that the present invention may be used with any type of transaction processing device or system, such as an automatic call distributor (ACD). Furthermore, the present invention can be used in environments having one or more remote computer systems capable of executing applications on a server (e.g., a file server, an information server, or a database server).

An application workflow editor (AWE) 200 provides a workflow diagram containing the visual primitives (also referred to as steps or step objects) of a transaction flow through a transaction processor (such as a telephone call router). AWE 200 is capable of generating, editing, and displaying various types of workflows that define the operation of a transaction processing system. AWE 200 provides the workflow diagram to a serializer 202 or a CCT compiler 204. CCT compiler 204 compiles workflow diagrams into a series of routing instructions or routing procedures (which may be stored in a routing table, such as a call control table (CCT)). Workflow diagrams may be stored in various formats (including an object-oriented format) on a local storage device 210. Local storage device 210 stores both the graphical diagram and the semantic information of workflow steps and their connections. In a particular embodiment of the invention, the storage device contains a complete set of workflows and subflows as a single entity. This entity may be a local file on a client, a named stream on an environment server, or stored as part of a call routing database. The format of the workflow diagram stored on local storage device 210 is typically created as an object-oriented serialization of the AWE data structure by serializer 202. Serializer 202 permits adding new step object types and data structures. Serializer 202 also provides for storing the workflow diagram representation in both a local file and in a call center database. CCT compiler 204 interprets semantic information from the AWE and generates routing instructions appropriate for execution by a call center or other transaction processing system.

AWE 200 communicates with an object management client 206 to obtain configuration information. Object management client 206 communicates with an object management server 208 via communication link 214. Object management server 208 contains information about one or more call processing devices or call processing systems. Additionally, server 208 permits control and management of one or more call processing devices. A call center database 212, contains one or more routing tables and other information regarding the operation of a call center associated with call center database 212. In the call processing system of FIG. 2, the call center (and its associated database 212) may be referred to as a "server", and the components to the left of communication link 214 may be referred to as a "client".

Figure 3:
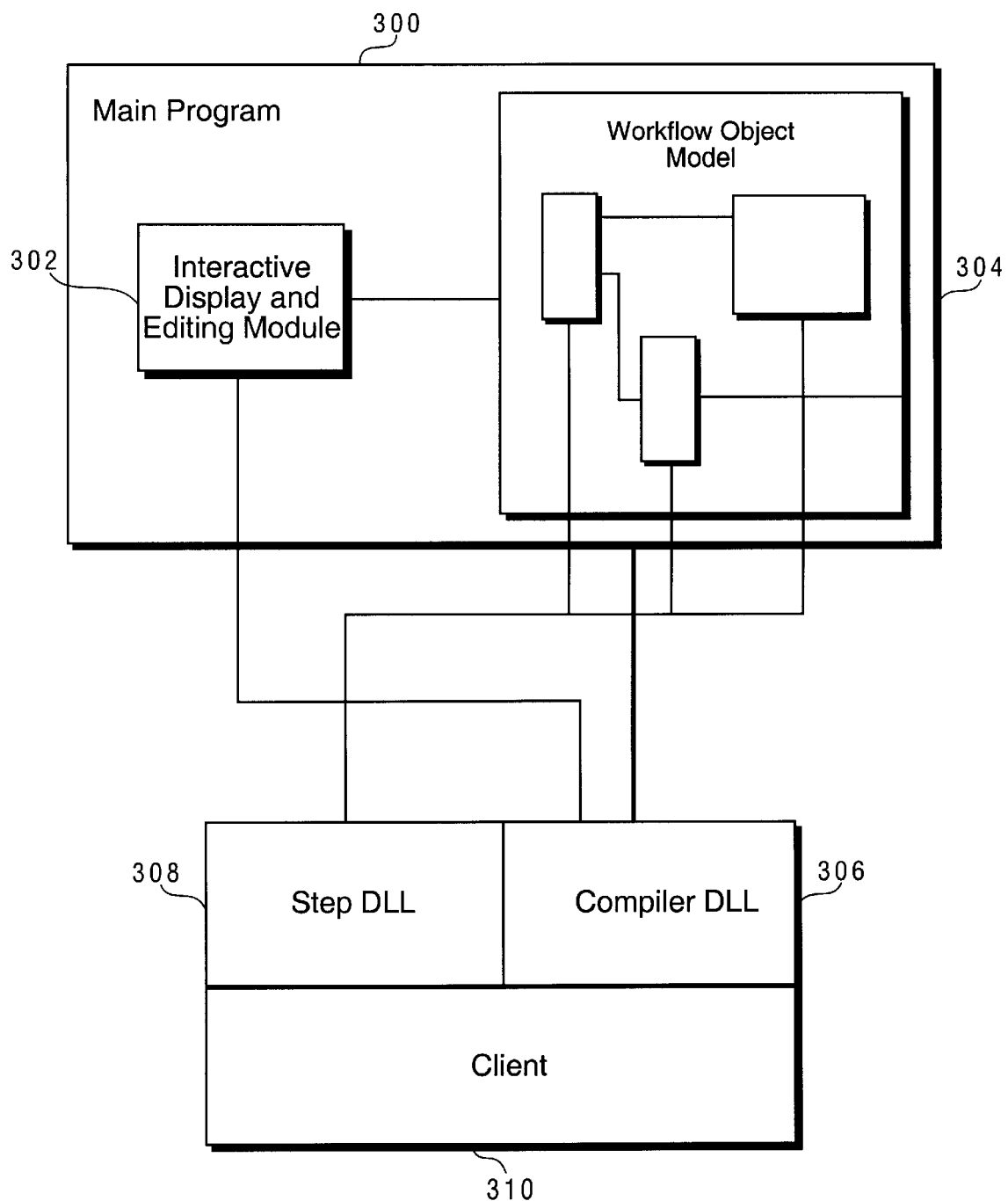
FIG. 3 is a system diagram illustrating an embodiment of the relationship between software modules compatible with the present invention.

The relationship between software modules compatible with the present invention is shown in FIG. 3. A main program 300 contains both an interactive display and editing module 302 and a workflow object model 304. Editor commands from editing module 302 create and modify workflow model 304. Each step contained in workflow model 304 is defined in a library of steps, which provide an object method for the display, configuration, and save/restore functions of each object by a step dynamic link library (DLL) 308. A compiler DLL 306 accepts a reference to the entire workflow object model 304, and uses both the workflow object model 304 and the library of steps to convert the workflow object model 304 into a form that can be executed by a client 310. Client 310 may, for example, control the operation of a call center or other transaction processing system or equipment.

Figure 4:
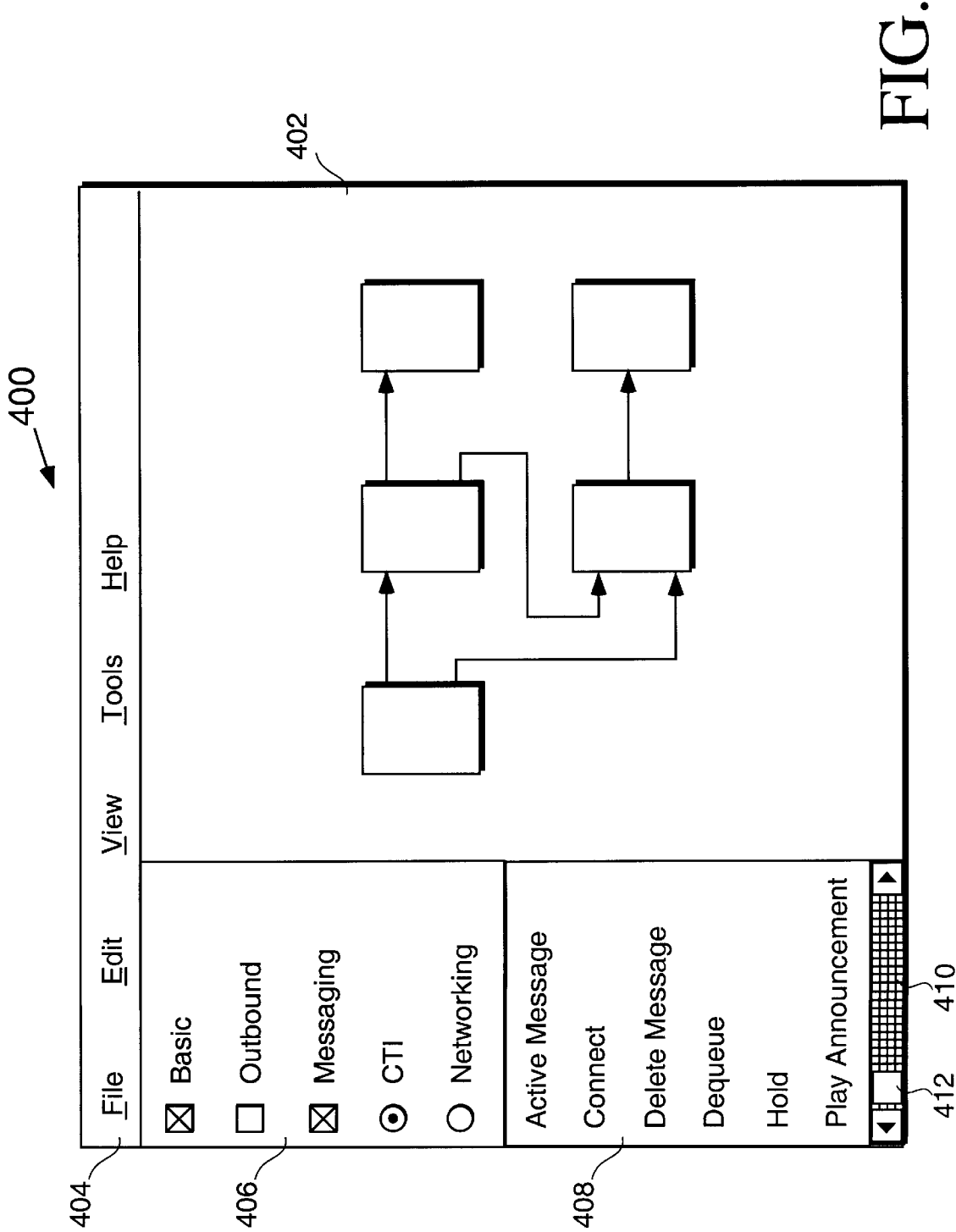
FIG. 4 illustrates an embodiment of a display generated by an application workflow editor.

FIG. 4 illustrates an embodiment of a display 400 generated by an application workflow editor (e.g., AWE 200). Display 400 includes a workflow window 402 that shows a workflow graphically as a series of steps (represented by icons) and connections between the steps. Additional details regarding workflow steps and their connections are provided below. Display 400 also includes a menu bar 404 with several pull-down menus of functions that can be performed by the workflow editor. Although not shown in FIG. 4, an additional bar containing a row of icons may be placed below menu bar 404. The icons in the additional row represent various functions that may be executed frequently (e.g., save, print, copy, and paste).

A library window 406 in display 400 identifies libraries that can be accessed by the workflow editor. A step window 408 in display 400 shows the workflow steps that can be selected for use with the workflow shown in workflow window 402. The steps shown in step window 408 may be represented using the name of the step (as shown in FIG. 4), using an icon to represent the step, or using both the name of the step and an icon. The steps shown in step window 408 are based on the libraries selected in library window 406.

In the example of FIG. 4, five libraries are available for access by the workflow editor. Three of the libraries (Basic, Outbound, and Messaging) use a "check box" to select or deselect the library. Each of the check boxes can be selected or deselected regardless of whether any other library is selected. In this example, both the Basic and the Messaging libraries have been selected. Thus, the steps contained in the Basic library and the steps contained in the Messaging library are shown in step window 408 and can be selected for use with the workflow shown in workflow window 402. Two of the libraries (CTI and Networking) use a "radio button" to select or deselect the library. Only one of the two radio buttons may be selected at a particular time. Thus, the user of the workflow editor must select either the CTI library steps or the Networking library steps. The steps associated with the selected library are displayed in step window 408 along with the steps from the Basic library and the Messaging library. In alternate embodiments of the invention, instead of using both check boxes and radio buttons to select libraries, all libraries use check boxes or all libraries use radio buttons.

Depending on the number of libraries selected in library window 406 and the number of steps associated with the selected libraries, step window 408 may not be capable of displaying all available steps simultaneously. A scroll bar 410 and scroll box 412 are located below step window 408 and permit scrolling through the various libraries selected if all steps cannot be displayed simultaneously. A similar scroll bar and scroll box may be used with library window 406 if the library window is not capable of displaying all available libraries simultaneously.

Application Workflow Editor

The AWE 200 of the present invention defines various types of transaction processes as workflows for automatic call distribution, computer telephony integration, interactive response, and related transaction processing applications. AWE 200 employs a graphical user interface capable of illustrating various workflows. AWE 200 creates a workflow application, consisting of a series of procedural workflow steps, in a control flow. Each workflow step is represented within AWE 200 as an icon or step (also referred to as a visual primitive). Each step can have one or more inputs and one or more outputs. The steps are sequenced by connectors to define the workflow. Connectors are lines that define the flow of control between steps. A connector links the output of one step to the input of another step.

Figure 5:
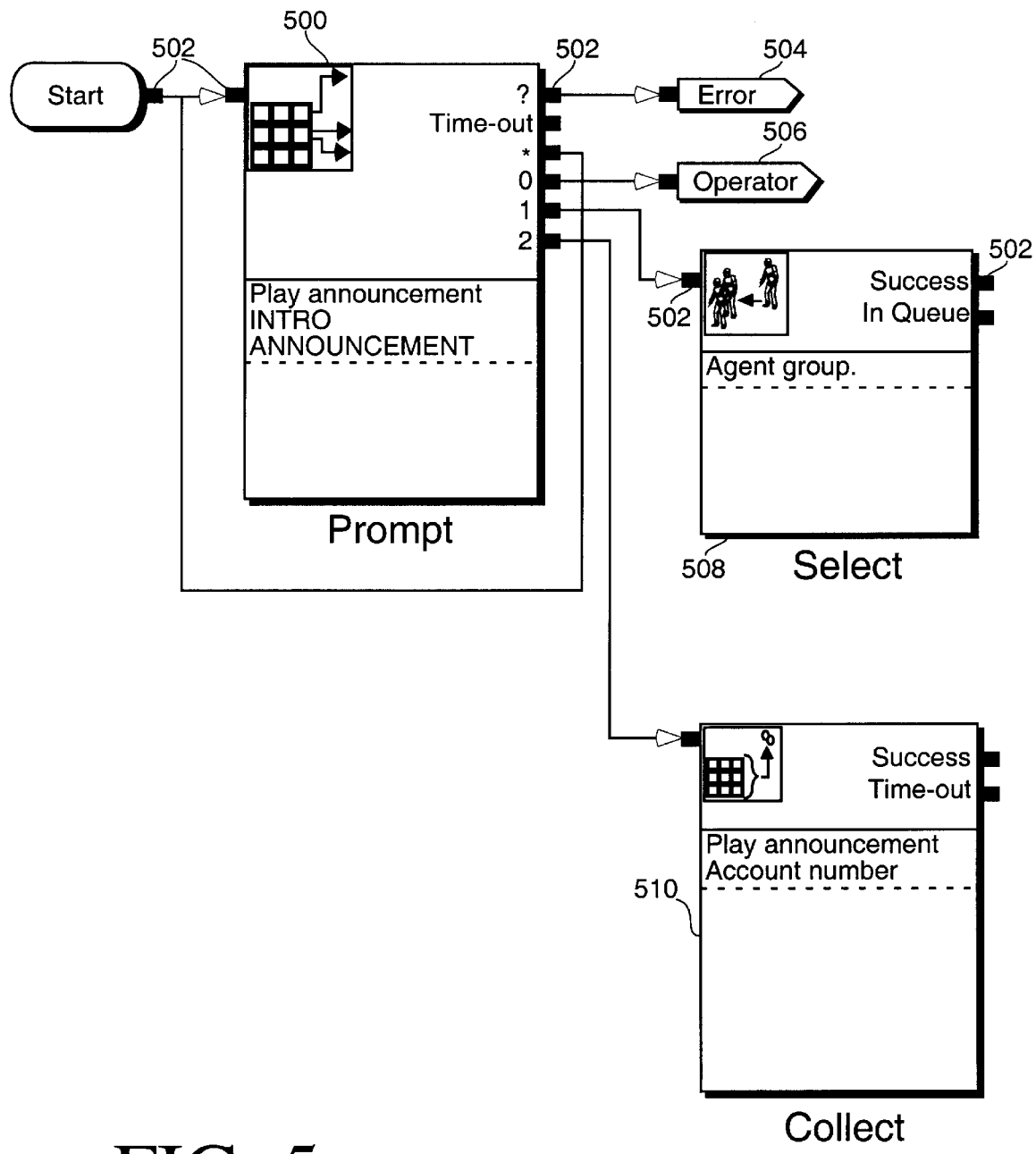
FIG. 5 is an example workflow diagram compatible with the present invention.

FIG. 5 is an example workflow diagram compatible with the present invention. Various icon formats can be used to represent the steps in a workflow. As discussed below, the icons shown in FIG. 5 contain alphanumeric text identifying details regarding the operation of the associated step. Thus, by including alphanumeric text as part of the icon, significant information about the workflow is provided in the graphical display of the workflow.

Other icon formats may eliminate some or all of the alphanumeric text from the icon to minimize the icon size and maximize the number of icons displayed in a particular area. Additionally, alphanumeric text may be placed anywhere in the transaction flow (e.g., notes regarding operation of the transaction flow). As used herein, alphanumeric text shall include all alphanumeric letters, numbers, symbols and other characters that may be displayed on a display device.

A Prompt icon 500 in FIG. 5 represents a prompt step in a workflow. The prompt step plays an announcement to a caller asking the caller to select among various options using their telephone keypad. If the caller selects "0", the workflow follows a connector to an Operator connector object 506, which has a corresponding connector object in the workflow that connects the caller to an operator. If the caller selects "1", then the workflow follows a connector to a Select icon 508, which selects an agent to answer the call. If the caller selects "2", then the workflow follows a connector to a Collect icon 510, which requests that the user enter their account number. If the caller selects an unused key or fails to press a key within a timeout period, then the workflow follows a connector to an Error connector object 504, which has a corresponding connector object in the workflow that announces an error and returns to the prompt step.

As shown in FIG. 5, the icons each have at least one connect point 502. As discussed in greater detail below, connections between icons are made using these connect points. Step icons (e.g., Prompt, Select, and Collect) generally have at least one input connect point and at least one output connect point. Label icons (e.g., Error and Operator) generally have a single connect point. Multiple connections can be made to or from a particular connect point (e.g., two connections to the connect point on Error connector object 504).

Several of the icons shown in FIG. 5 contain additional text at the bottom of the icon describing the operation or functions performed by the step. The broken line shown below the last line of text in icons 500, 508, and 510 is not displayed by the workflow editor, but instead indicates the bottom of the icon if no additional text is added. For example, in Prompt icon 500, additional space is provided to add more text below the existing text. If, no additional text is added to below the existing text, then Prompt icon 500 will be dynamically resized such that the bottom of the icon is located at the broken line. Additionally, the "Prompt" text below the icon will be moved up to a position below the resized icon. This dynamic resizing of icons allows additional text to be entered in an icon, but minimizes the size of the icon after the text is entered. Furthermore, if additional text is added beyond the current bottom of the icon, then the icon size is expanded to accommodate additional text.

If an icon has multiple outputs, then additional text is positioned adjacent the output to indicate the situations or results that cause selection of the output. For example, Prompt icon 500 has six outputs, each with associated text that identifies when the output is selected.

AWE 200 permits the creation of large workflows. An actual workflow may contain hundreds or thousands of steps and hundreds or thousands of connections. When viewing large workflows, AWE 200 displays a portion of the workflow and provides scrolling throughout the entire workflow. Additionally, AWE 200 provides "zoom in" and "zoom out" operations to control the portion of the workflow displayed. The "zoom in" and "zoom out" operations effectively change the scale of the workflow being displayed. AWE 200 does not require a particular placement of visual primitives and does not use a predefined format for positioning visual primitives. Instead, AWE 200 provides for flexible arrangements, such that a user may position visual primitives anywhere in the workflow. Particular embodiments of the invention use a "snap grid" to align visual primitives (e.g., to the nearest 0.1 inch position). As discussed in further detail below, certain visual primitives may be repositioned as necessary as part of a rerouting procedure.

Furthermore, AWE 200 permits the creation and modification of workflows without repeatedly changing between different modes of operation. For example, steps are selected from a step window (e.g., step window 408 in FIG. 4) and positioned in the workflow (e.g., in workflow window 402). Connections are then established by moving a pointer over a connect point, depressing the pointer, and moving the pointer until the desired connect point is highlighted. The pointer is then released and the connection is established. Also, steps can be repositioned within the workflow without changing to a different editing mode. Thus, step placement, connection of steps, and repositioning of steps can be performed without changing to different editing modes. This simplifies the operation of the workflow editor because a single editing mode allows the user to perform multiple editing operations without changing editing modes.

AWE 200 also supports multiple levels of undo and redo commands with respect to editing operations. Executing the undo command reverses the effect of the most recent editing operation. Executing another undo command reverses the next most recent editing operation. The redo command can be executed one or more times to reverse the effect of one or more undo commands. To support these undo and redo commands, each operation that makes an editing change saves the state of the entire workflow to an undo list before the editing change is implemented. Viewing commands that do not change the workflow (e.g., zoom in and zoom out) are not saved to the undo list. The undo command is implemented by restoring the state of the workflow from the undo list. Successive undo commands restore previous workflow states from the undo list. After executing one or more undo commands, an editing operation that changes the workflow will invalidate any available redo states. In alternate embodiments, rather than storing the entire workflow state after each operation that makes an editing change, AWE 200 only stores incremental changes to the workflow state (i.e., the changes caused by the editing operation).

Figure 6:
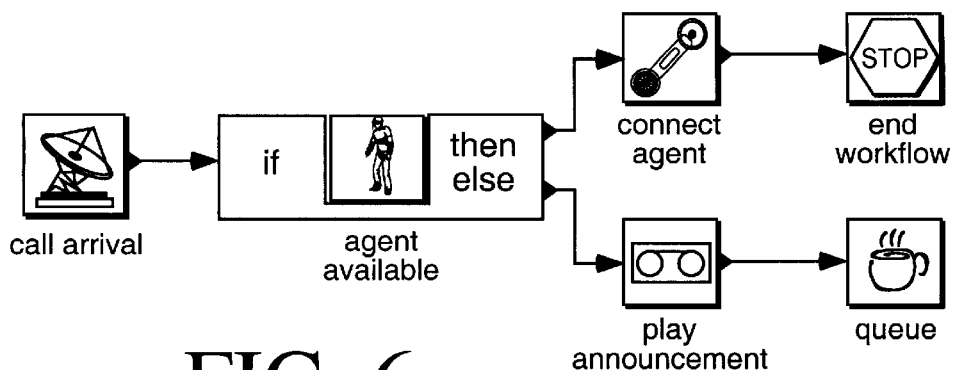
FIG. 6 is another example workflow diagram compatible with the present invention.

Another example workflow is illustrated in FIG. 6. In this example, the icons (or visual primitives) that represent the steps of the workflow are illustrated in a different format. The icons shown in FIG. 6 are smaller in size and contain less additional text than the icons shown in FIG. 5. In the example of FIG. 6, an arriving call reaches a step that determines whether an agent is available to handle the call. If available, the workflow follows a connector to the "connect agent" step and the workflow ends. If an agent is not available, then the workflow follows a connector to a "play announcement" step and the call is placed in a queue. The workflow then returns to await the next call arrival.

In an embodiment of the invention, AWE 200 is implemented as an object framework bundled with workflow step object classes. Programming an application consists of creating instances of step objects, specifying their properties, and connecting them to other step objects. From an application developer's perspective, the programming power of AWE 200 is largely determined by the capabilities of the step object classes that are bundled with it. This creates an open application development tool in which new step object classes may be added. AWE 200 creates distributed workflows, which may execute on multiple homogeneous or heterogeneous workflow engines.

AWE 200 is capable of displaying multiple portions of a workflow simultaneously by using multiple windows. This "split window" display is useful for viewing large workflows that extend beyond the boundaries of the display window. Each of the multiple windows can be scrolled independently of the other windows to display the desired portion of the workflow. Additionally, AWE 200 permits establishing connections between visual primitives in different windows.

After a workflow has been created or modified using AWE 200, the workflow is distributed to a transaction processing system. In particular embodiments of the invention, the workflow is compiled into a format readable to the transaction processing system prior to distribution of the workflow to the transaction processing system. The transaction processing system then executes the procedures defined in the workflow. In other embodiments of the invention, a workflow is distributed to multiple transaction processing systems, thereby eliminating the need to create the same workflow on multiple systems.

Visual Representation

In addition to semantic relationships, the workflow object model 304 (FIG. 3) must also contain information regarding the appearance of the various objects in a workflow diagram. Each object inherits from a base object with a virtual function that returns its bounding rectangle. This rectangle must be registered in a layout map. The layout map is a container of all step objects in the associated transaction flow diagram. Subsequently, the layout map may be used for hit testing by checking to see if any of its registered rectangles overlap or are contained by another rectangle. A "hit" is registered if a rectangular region overlaps an existing step, object, connection line, or other visual primitive. An important part of the visual object model is representing labeled connectors and labeled connections. The labeled connector is visible as an object with a connection point, yet it is not a step object. Various layouts are used in the system, each containing particular information about a workflow. An example of information contained in the layout map includes:

1. Step layout. Steps are based on extensions of ActiveX controls. The step layout provides graphical information regarding the step (e.g., the bounding box associated with the step).

2. Connect point layout. The connect point is a zero width/zero height hot spot. It is preferably represented as a relative XY offset from the origin of the control. For hit testing, a small box centered around the connect point location is used.

3. Connection layout. In the simple case of unlabeled connections, a sequence of points defines the route from one connection point to another. The connection bounding box is defined to be the box that encloses all the points of the route.

4. Labeled connector layout. The connector has the position of the connector as well as the sequence of points for the route from a connection point to a labeled connector. The labeled connector also has a container of connections which reference it. The bounding box for the connector and its routing is registered in the layout map.

5. Text block layout. The layout uses the position of the bounding rectangle for the text and the text itself. The bounding rectangle for the text dynamically changes its size by expanding or reducing the margins (e.g., the bottom margin) of the bounding rectangle to accommodate the text.

6. Structures for fast hit testing. These include sets for horizontal and vertical line segments, a set for all objects sorted horizontally, and a set for all objects sorted vertically.

Working Data

In addition to the layout map described above, AWE 200 has additional data to support editing and display operations. The additional working data is associated with the top level workflow except for application preferences. Working data is built on-the-fly and applies to the current editing session. Working data is not typically saved as part of the serialization process. The additional data to support editing and display operations may include:

1. A selection container for all objects that are selected. The selection container includes pointers to various workflow objects. Run time type information can be used to determine the type of object selected. The selection container belongs to a workflow document object.

2. An undo list. The undo list stores the information needed to undo or redo a command. It has pointers to serialized data of the entire state of the workflow.

3. A simple container of all objects is used to return a subset container with objects that either intersect or are wholly contained by a bounding rectangle. The returned container is used to initialize the selection container.

4. Step object library. The step object library has information for each kind of step supported by the workflow. The library entries keep track of input and output connect point counts, the step icon, and other information related to the supported steps.

5. A dispatch map. The dispatch map is used to invoke the methods on a step object that is implemented as an ActiveX control.

6. Application preferences such as palette display, workspace display, and other configuration information.

Workflow Templates

As part of a help system, various workflow templates may be provided to illustrate different types of workflows. The workflow templates can be for purposes of illustration and explanation of the various steps and connections in the workflow. Alternatively, a user may select a workflow template and modify the template to meet their own needs. Thus, rather than designing a new workflow, the user can select a workflow template that already contains many of the required steps and connections.

In a particular embodiment of the invention, a workflow template is selected from a help screen. For example, a user of a workflow editor requests additional information or help regarding a particular topic. The help screen provided by the workflow editor permits the user to view a workflow associated with the topic for which help was requested. Alternatively, the user may be presented with a list of several workflows that may be viewed. After viewing a particular workflow template, the user can make a copy of the workflow on a local storage device. The local copy of the workflow can be edited with the workflow editor in the same manner as any other workflow.

Initiating Workflows

In one embodiment of the invention, workflows are initiated by event triggers. An event trigger associates a particular event with one or more workflows. An example of an event trigger is a call arrival that initiates call routing. Each domain has a registry of event triggers that lists the external events to which a particular workflow may respond. Workflows may also be initiated directly from within another workflow.

An event trigger is defined by specifying the conditions under which a workflow is initiated. Thus, an event trigger can be thought of as a rule for describing when a workflow is started. It will be noted that workflow initiation is not specified as part of the workflow. Thus, the event triggers associated with workflows can be modified without changing the workflow itself.

In another embodiment of the invention, event triggers are not used. Instead, the first step of the workflow detects an arriving call. When an arriving call is detected, the workflow continues to the next step in the workflow. For example, after detecting an arriving call, the workflow continues to the next step to identify an agent capable of handling the arriving call.

Workflow Steps

Figure 7:
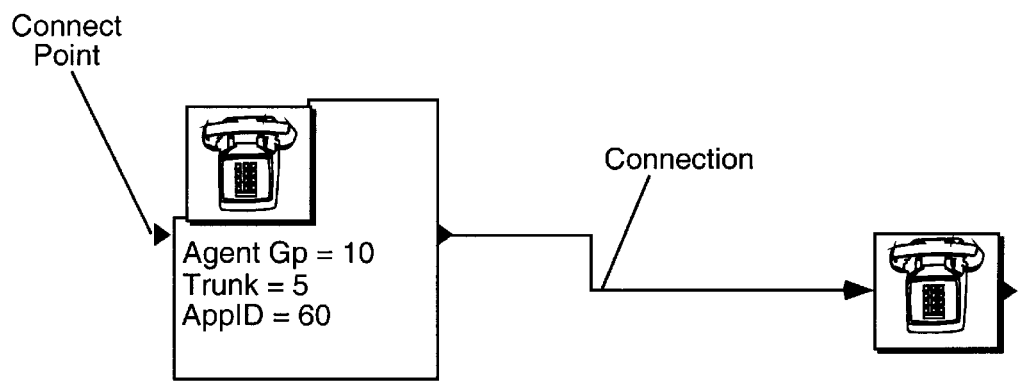
FIG. 7 illustrates two exemplary workflow steps compatible with the present invention.

As discussed above, each workflow step (or icon) has a set of connect points, as shown in FIG. 7. A step displays its connect points as visual marks on the left and right edges. The flow of control between steps is identified by the lines between the connect points. Connect points are either input or output connections. Flow of control passes from a step's input connect point(s) to its output connect point(s). Workflow steps may be contained in a single library or may be grouped together in multiple libraries. A particular step may be contained in multiple libraries if the step can be used with multiple applications.

As discussed above, step icons may be contained in various libraries. In an embodiment of the invention, steps are grouped into sets of steps. These sets of steps are dynamic in size and can be modified by adding new steps to the set or removing existing steps from the set. A particular step may be contained in multiple sets. Each set is a set of ActiveX controls that are shown as steps in a workflow. The sets of steps grouped together into libraries. For example, separate libraries may be provided for electronic mail applications, Internet applications, and ACD applications. The libraries are also dynamic and permit sets to be added to or removed from the library. Similarly, a particular set of steps may be contained in multiple libraries. Steps may have an iconic visual representation, with any number of inputs on the left side and any number of outputs on the right side. Other embodiments of the invention may place the input connect points and the output connect points on any side of a step icon. Additionally, input connect points and output connect points may be located on the same side or the same portion of a step icon.

Steps may include a property list. Properties may have standard scalar values such as type string or integer. A property value may also be a collection of standard scalars or a collection of collections. As shown in FIG. 7, three separate properties are identified with the first step. Steps provide their own interface for property editing, which is normally a standard dialog or tabbed dialog box with property values, but could vary considerably. For example, a step can have a property editor that allows the input of a script of commands or the launch of another visual programming environment.

The size and shape of a particular step icon can change based on the number of properties associated with the step. If the number of properties associated with a particular step changes, then the size of the step icon is dynamically changed (e.g., increased to allow display of additional properties, or decreased if a property is deleted). This dynamic resizing based on displayed properties is similar to the dynamic resizing discussed above with respect to the addition or deletion of text indicating the functions performed by the step.

Connector Objects

Figure 8:
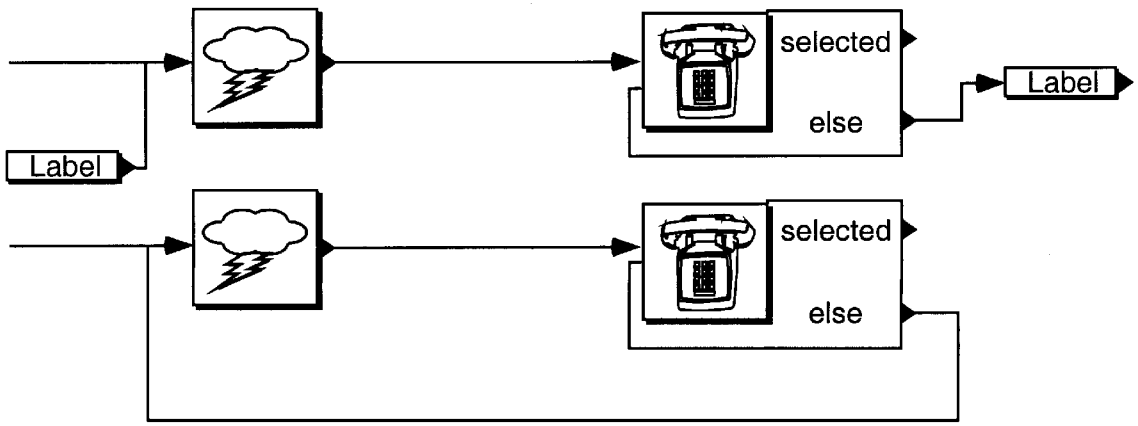
FIG. 8 is an example connector object compatible with the present invention.

A connector object makes a connection by name instead of with a line, as shown in FIG. 8. It is typically a small object that displays its name as a label. The top workflow shown in FIG. 8 illustrates the use of connector objects. The bottom workflow shown in FIG. 8 illustrates an equivalent workflow without using connector objects. Connector objects may be coupled to the input or output of a step. An output connector is connected to an object output and transfers control to an input connector of the same name. An input connector transfers control to the object to which it is connected. For the set of connector objects with the same name, one of them is an input connector. Multiple input connectors with different names may be connected to the same connect point.

Expression Evaluation Steps

An embodiment of an expression evaluation step allows the performance of arithmetic or Boolean operations. The expressive evaluation step can assign the value of an expression to a variable and return a value for use as a condition step. The expression evaluator supports direct typing of an expression using standard arithmetic and Boolean operators. As an alternative, a structured expression builder may be provided to build expressions by selecting choices from a list of available expression elements. Varying capabilities of the expression evaluator step are available depending on the variables and capabilities of the underlying workflow execution engine.

Control Flow Steps

The present invention provides for standard steps to implement control flow within a processing thread. The steps include, for example, IF and CASE. The IF and CASE steps select a branch based on a conditional expression. The IF step selects between two outputs based on a particular event or condition. For example, the IF step in FIG. 6 selects between queuing an incoming call or connecting the call to an agent based on whether an agent is available. The CASE step selects between multiple outputs based on an event or condition. For example, Prompt step 500 in FIG. 5 is a CASE step that selects between six outputs based on the telephone key pressed by a caller.

Functions and Operations

The visual design tool of the present invention provides a number of functions and operations to assist a user in the creation of a visual workflow, as described below. In some cases, the method to perform each function or operation is described below as a series of numbered steps. Exemplary functions and operations are discussed below as used in a call processing environment (referred to as a Call Center), such as an automatic call distributor (ACD). It will be appreciated that various other functions and operations may be used with the present invention.

Application Initialization

1. Load user preferences.

2. Read the operating system Registry to get a list of ActiveX Controls.

3. If a Call Center was specified on the command line, set the current Call Center and retrieve Call Center and optional software flags.

4. If a CCT was specified on the command line, then open the CCT. If read access is not permitted to the specified CCT, then display error information.

File Open

1. Retrieve a list of Call Centers. If a Call Center has previously been selected, then identify it as the current item in a list of all Call Centers. Otherwise, the first Call Center in the list is identified as current. Retrieve a list of CCTs for the current Call Center.

2. Display list of CCTs, updating the list of CCTs if a different Call Center is selected.

3. If there is a previous workflow loaded, close it.

4. Open the selected CCT.

File New
1. If there is a previous workflow loaded, close it.
2. Create an empty workflow object and create an external connection point as a start object. The start object may be moved, but generally cannot be copied or deleted. The start object is a special case of an external connect point. However, there may be multiple external connect points that are inputs and/or outputs to a particular workflow.

File Save
1. Check for edit/create permissions. The application can perform a redundant check out to ensure that any CCT locks have not been overridden.
2. If a read-only CCT is being edited, the save operation cannot be activated and an error message is displayed.
3. If the workflow was created with File New and has not already been saved, then execute File Save As instead.
4. If any steps are invalid or erroneous and the file source is the Call Center, abort the save and display an error message. If the file source is a local file, display a warning to let the user choose whether to abort or proceed with the save operation.
5. Compile the workflow diagram and attempt to save it to the original file source. If the compile fails, report any errors. Compile errors and warnings are reported by traversing the diagram looking for properties attached by the compiler. The list of properties identified is displayed as a list.
6. When saving to a file, save to a temporary file first, then delete the original file and rename the temporary file.

File Save As
1. Check for invalid or erroneous steps.
2. Display a list of existing CCTs or a list of files, depending on the original file source. If the CCT is new, show a list of CCTs.
3. Check an existing CCT if selected. If the check is successful, prompt to confirm overwrite. If the check fails, display who has checked out the CCT.
4. Create the CCT if a new name is specified. Creating the CCT displays a dialog box to enter a CCT number, description, and application. The CCT number field is initialized to the first available number.
5. After a file destination has been specified, follow the compile procedure as described above.

File Close
1. If the modified flag is set, prompt to save the workflow.
2. If the workflow is opened for edit, check it in for check-out by others.
3. Delete the document and associated working data.

Change Call Center
1. Retrieve list of Call Centers and show current entry.
2. If a different Call Center is selected, then validate the workflow against the new Call Center.
3. After the Call Center has been changed, prompt for a confirmation the first time File Save is executed.

Adding Steps and Objects
1. Detect drag from palette to workspace.
2. Create an invisible control to retrieve bounding box and connect point locations.
3. When drag finishes, make control visible and move it to final destination. Register the control with the dynamic event map. Register the position with the layout map.

Adding Connections
1. Detect drag at a connect point. Use a layout map to find any objects within a small rectangle at the cursor location.
2. If a connect point is found within the rectangle, start drawing a rubberband line from the connect point to the cursor location.
3. While rubberband feedback is on, determine whether any connect point (other than the current one) is within a small rectangle at the cursor location. If a connect point is found, show a highlight at the nearest connect point.
4. When drag ends, create a connection if the connect point is within a small rectangle. Create the routing for the connection and register it with the layout map. If there was an existing connection, delete and unregister it. If there is no nearby connect point, then end the rubberband feedback and do not add a connection. In one embodiment of the invention, the connection must terminate on a connect point (i.e., the system rejects "floating" connections).
5. Identify whether the connection started from an input or an output connect point. If starting from an input connect point and the cursor location is anywhere over a step with one output connect point, then highlight that output. Similarly, if starting from an output connect point and the cursor is over a step with a single input connect point, then highlight that input.

Figure 9A:
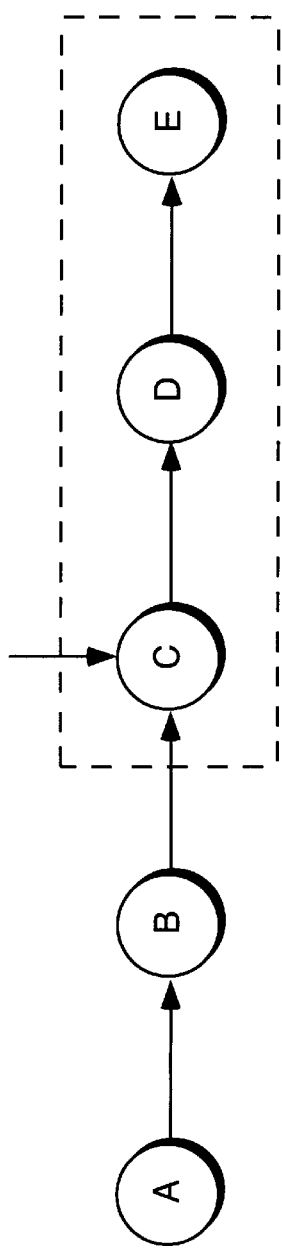
FIG. 9A and FIG. 9B illustrate examples of an "extend selection" procedure for selecting multiple steps.
Figure 9B:
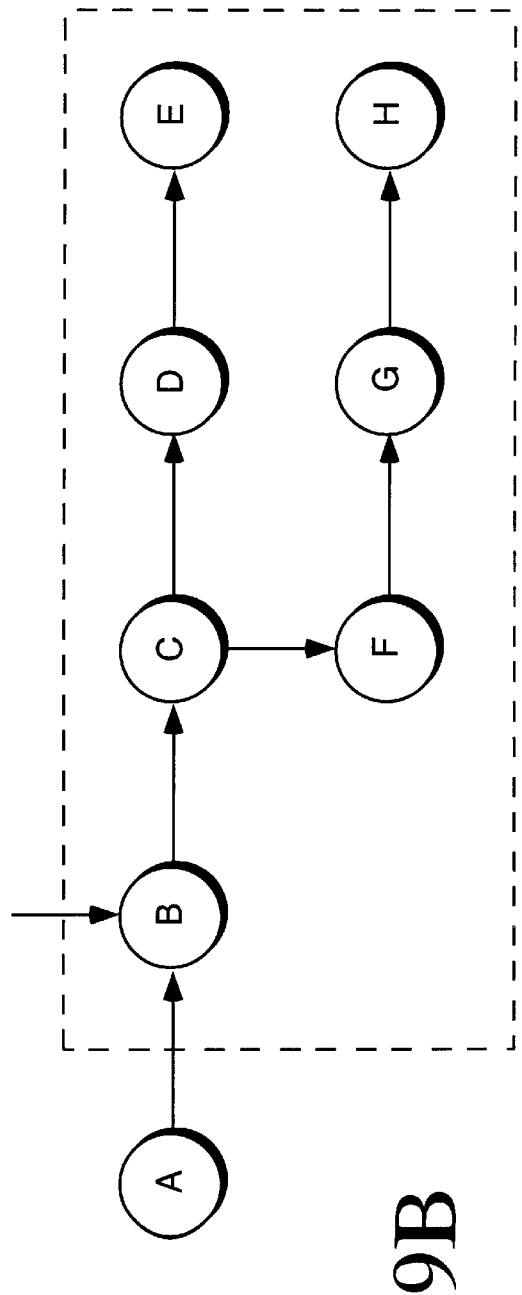

Selection
1. A single click by the pointing device over an object, but away from any of its connect points, selects the object and deselects any other objects. Any object may be selected, including steps, connection lines, connectors, and text blocks.
2. A rectangular drag that completely contains an object or set of objects selects the enclosed items.
3. A click or drag that does not select any object merely deselects all objects. That is, deselection is accomplished by clicking on an empty part of the workspace.
4. A particular selection may be extended by selecting an "extend selection" operation. The selected step is "extended" to the right (or left) until the end (or beginning) of the workflow is reached. This extend selection operation may be used instead of placing a window around several steps or selecting multiple steps individually. FIG. 9A and FIG. 9B illustrate examples of the extend selection operation. In FIG. 9A, step C is selected with the extend selection operation, thereby causing steps C, D, and E to be selected (i.e., all steps to the right of, and including, the selected step). In FIG. 9B, step B is selected with the extend selection operation, thereby causing the selection of steps C–H. If two or more steps are selected when the extend selection operation is initiated, then all selected steps are extended to the right (or left).

Property Sheets
1. A property sheet is associated with each step and is displayed by selecting the step (e.g., by double-clicking using a pointing device).
2. A property sheet is also associated with each label and each text block. The property sheet for these objects allows editing of the name of a label or editing of the text contents of a text block.

Print and Print Preview
The page size for the current printer is queried and displayed in the workspace. A printing scale can be defined as part of Page Setup and the effective page size is updated accordingly. A header may be displayed on each page with workflow name/number, and page/grid number. The grid number is the X and Y offset of the page when a diagram must be split across multiple pages.

Automatic Icon Connection
Icons representing steps in a workflow may be positioned in the workflow window and connected together manually. However, an embodiment of the invention provides for automatic connection of a connection line to a connect point on an icon. Each connect point has an associated connect region (e.g., a rectangular region surrounding the connect point). The size of the connect region may be defined by the user of the editor, and the size may vary between different connect points and different visual primitives. When a connection line is being positioned by a user, the workflow editor locates and highlights a connect point if the pointer is within the connect region of the connect point. If the highlighted connect point is the desired connect point, then the user can release the pointer and the connection is automatically made to the highlighted connect point. Thus, rather than requiring the user to directly place the pointer on the desired connect point, the workflow editor automatically selects the closest connect point. If the pointer is released when a connect point is not highlighted, then no connection is established.

Additionally, the workflow editor can be configured to automatically select only the correct type of connect point (i.e., input connect point or output connect point). For example, if the user begins drawing a connection line from an output connect point, the workflow editor will automatically select the closest input connect point, but not select other output points because an output is not generally connected to another output.

Embodiments of the invention also provide for the automatic connection of two icons when the icons overlap one another in the workflow window. For example, if a first icon is already located in the workflow window and a second icon is placed over the first icon, then the workflow editor automatically establishes a connection between the first icon and the second icon. Additionally, an additional icon can be placed in series between two existing icons by placing the additional icon over the connection line between the two existing icons.

Figure 10A:
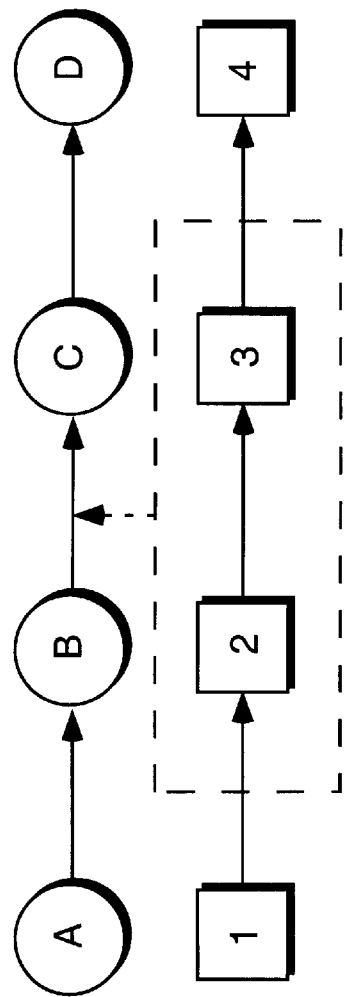
FIG. 10A and FIG. 10B illustrate examples of a procedure for inserting a first group of steps into a second group of steps.
Figure 10B:
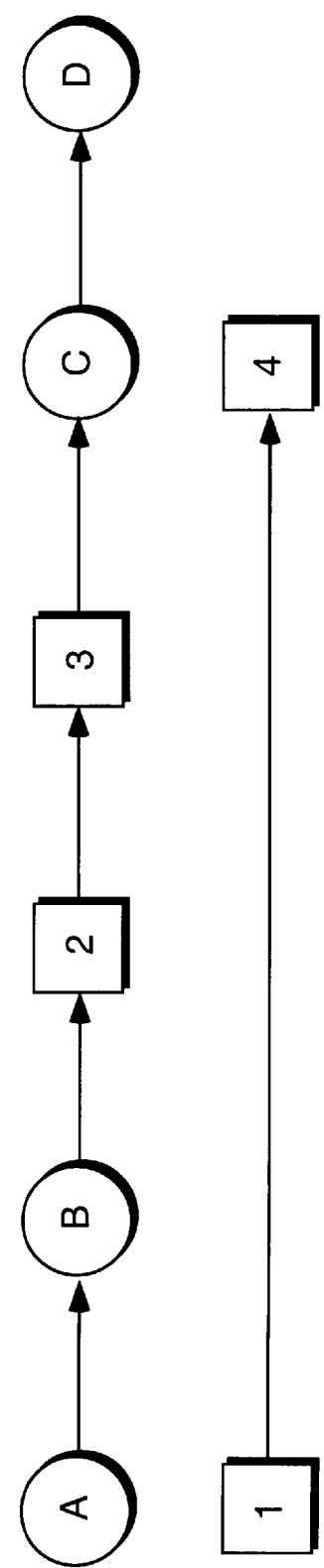

Similarly, multiple icons (each representing a step or a label in a workflow) can be automatically connected to another group of multiple icons, as illustrated in FIG. 10A and FIG. 10B. In FIG. 10A, steps 2 and 3 are selected using the workflow editor. Steps 2 and 3 are then dragged over the connection line between steps B and C, thereby indicating that steps 2 and 3 are to be inserted between steps B and C. FIG. 10B illustrates the result of the operation performed in FIG. 10A. As shown in FIG. 10B, steps 2 and 3 were inserted between steps B and C, and the appropriate connections between step B and step 2, and between step 3 and step C were automatically established. Additionally, the connection between steps 1 and 4 is established automatically after the removal of steps 2 and 3.

Visual Indicators

If a particular workflow is not complete, or contains errors, a visual indicator (or visual alert) is generated and displayed by the workflow editor. The visual indicator can be any type of highlighting, visual marker, or other visual change that affects the appearance of the workflow. For example, the incomplete or erroneous steps or connections may be highlighted in a different color or surrounded by a bounding rectangle. The visual indicator notifies the user of the workflow editor that the workflow is incomplete and indicates the step(s) and/or connection line(s) that require additional editing. For example, if a step is missing required configuration information (e.g., an uninitialized property), a visual indicator (such as an asterisk or other symbol) is displayed within or near the step. Steps that do not require configuration will not display this visual indicator. A visual indicator may also be displayed within or near an improperly connected line or other visual primitive in the workflow. When the incomplete or improper visual primitive has been corrected, the visual indicator is removed by the workflow editor.

Place and Route

The automated connection and arrangement of objects in the editor is described generally by the following procedure. Additional details regarding procedure are provided below. The connection and arrangement of objects in the editor occurs automatically if an existing step or connection line is edited such that the previous placement of the object or a connection line requires rerouting. This rerouting may cause the repositioning of one or more objects and the modification of one or more connection lines. Additionally, the user of the workflow editor can manually invoke a "clean-up" operation that repositions and reroutes the objects in the workflow to provide a more logical arrangement and a more aesthetic appearance.

1. Create groups of step objects based on their connections.

2. Attempt to merge groups that overlap. Merging intelligently breaks and makes connections based on the nature of the overlap.

3. Remove overlaps without merging. For automated placement with Auto Arrange or Regenerate commands, groups of steps are arranged in "logical" order. In other cases, the overlaps are removed in a way that minimizes changes in the layout of the diagram.

4. Route all connections that need to be routed.

5. Remove overlaps of non-step objects.

Depending on the desired result, only a subset of the above steps may be performed. For example, merging is skipped when pasting objects into the workspace. Auto-insert is implemented by intentionally creating an overlap and invoking a merge.

Grouping

Groups are determined by traversing steps and their connections. In an incomplete diagram, there may be several unconnected "islands" of steps. There may also be cyclic connections, both as part of a left-to-right flow and as an isolated island. The job of grouping is to intelligently associate steps that preserve the intuitive "structure" of the workflow diagram.

Groups are organized into a tree of successors and predecessors. A root group is created that can be used to recursively traverse all groups in the diagram. Grouping of steps is also an important efficiency optimization. Some operations in placement and routing require pairwise testing for overlaps or relative position. An exemplary grouping procedure is illustrated by the pseudocode below:

```
for each object in the workflow
{
    if object has no connected inputs (or no inputs)
    {
        A: if there are multiple successor objects (branches)
           or if there are multiple input objects (loops)
        {
            Recursively create new groups for each successor.
        }
        else
        {
            Find the successor objects and add them to the group.
        }
    }
}
// Repeat the search to find any "islands" that were
// not included in the previous loop.
``` for each object in the workflow
{
   if object has a connection that goes backwards
   {
     perform steps in A.
   }
}

Merging

Merging is performed by looking for an overlap at the left-most selected object. As mentioned above, this overlap may have been intentionally created as part of an automatic icon connection process. If such an overlap is found, connections are added as described by the following example pseudocode:

Remove and remember input connections on the overlapping object.

Remove and remember output connections on the rightmost selected object.

Remove and remember output connections on the overlapped (non-selected) object.

// This "heals" the connections at the previous location of the overlapping object(s).

Create connections such that the old input connections to the overlapping object become new connections to the outputs of the rightmost selected object.

// This creates the "auto-connect" connections for the merged object.

Create connections from the overlapped object to the overlapping object.

Create connections from the rightmost selected object to the previous destination of the overlapped object.

Move other objects to create space for the overlapping objects.

Move entire selected set to fit into space just created.

Placement

In an embodiment of the present invention, placement is performed in two ways: 1) by removing overlaps in a way that preserves diagram layout and 2) by rearranging the layout based on the successor structure of groups. The automated arrangement of groups is used when upgrading from previous releases without diagrams, or when cleaning up an existing diagram with an undesirable layout. Removal of overlaps is described by the following exemplary pseudocode:

Sort the groups by Y.
for each group from top to bottom
{
   if group overlaps mostly in Y
   {
     Remove the overlap my moving groups below it downward.
   }
}
// The second pass removes any remaining overlaps.
Sort the groups by X.
for each group from left to right
{
   if group overlaps in any direction
   {
     Remove the overlap my moving groups to the right.
   }
}

Rearrangement of groups is performed with the following procedure.

Recursively compute maximum depth of group from root.

Recursively arrange from the root group
{
   if first group from root
   {
     Position group at standard start position.
   }
   else if other immediate descendant from root
   {
     Position group at left of workspace and below groups already arranged.
   }
   else
   {
     Position group to right of most immediate predecessor.
   }
   Recursively arrange groups after current group.
}

The connections associated with any objects that are moved are added to the set of connections that need to be routed.

Routing

Routing performs a search to make a connection between pairs of steps. Particular embodiments of the invention use a restricted search to preserve the intelligibility of the workflow diagram. Conventional routers used for electronic design often use all available routing space when making a connection. This may result in hard-to-read routes that do not adhere to a left-to-right flow.

The router used in an embodiment of the present invention searches for a limited set of left-to-right alternatives when making a connection. The problem with a restricted set of alternatives is that a large number of incomplete routes may result if all simple alternatives are obstructed. Obstructions may arise from the placement of steps or other objects, or they may result from existing routing.

The restricted search for alternatives creates routes with a limited number of jog connections (e.g., 0, 1, or 2 jog connections). Here, a jog is defined as a vertical segment that breaks a horizontal line segment. Three main types of connections are handled: 1) pure horizontal connections, 2) forward connections that require at least one jog (e.g., not horizontal), and 3) backward connections.

To ensure completion of virtually all routes, the location of obstructions may be adjusted during the routing process. Any object may be repositioned, including the source and destination objects of the connection. Repositioning results in the connections to the moved object being added to the set of connections to be routed. After repositioning, the routing process is repeated.

For routes that cannot be completed even with iterative position adjustments, a simple diagonal line is drawn. In these cases, the drawing may be manually improved by moving the steps with diagonal connections so there is more space to complete a simple left-to-right route.

When routing a set of connections, the router starts with the shortest connections first. This tends to permit an optimal path for short connections. This is important aesthetically because non-optimal paths are more apparent for these short connections.

An embodiment of the overall routing procedure is described by the following pseudocode:

for each connection to be routed
{
   if horizontal connection is possible
   {
     if no obstructions

```
{
    Make connection and go to next connection.
}
else if routing obstruction
{
    Remove obstruction connection and add to
        reroute set.
    Make connection and go to next connection.
}
}
if forward connection and 1 jog connection is possible
{
    Make connection and go to next connection.
}
// Try a 2 jog connection next.
// The location of the intermediate horizontal segment
    is important.
if enough room between top of lower step and bottom
    of upper step for a horizontal segment
{
    Search upwards for free horizontal segment between
        the source and destination steps.
}
else
{
    Search downwards for free horizontal segment
        below any obstructions between the source and
        destination steps.
}
if no free horizontal segment can be found
{
    Adjust steps below first search location for horizon-
        tal segment.
}
else
{
    if 2 jogs are available from steps to horizontal
        segment
    {
        Make connection and go to next connection.
    }
    else
    {
        Reposition obstructions to jogs.
    }
}
}
```

Figure 11A:
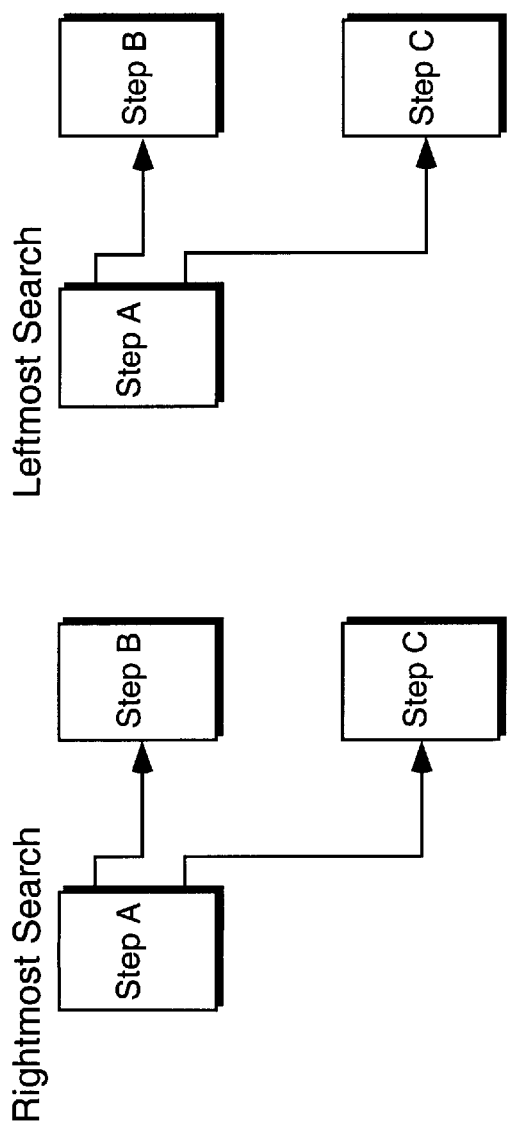
FIG. 11A and FIG. 11B show a workflow routing method compatible with the present invention.
Figure 11B:
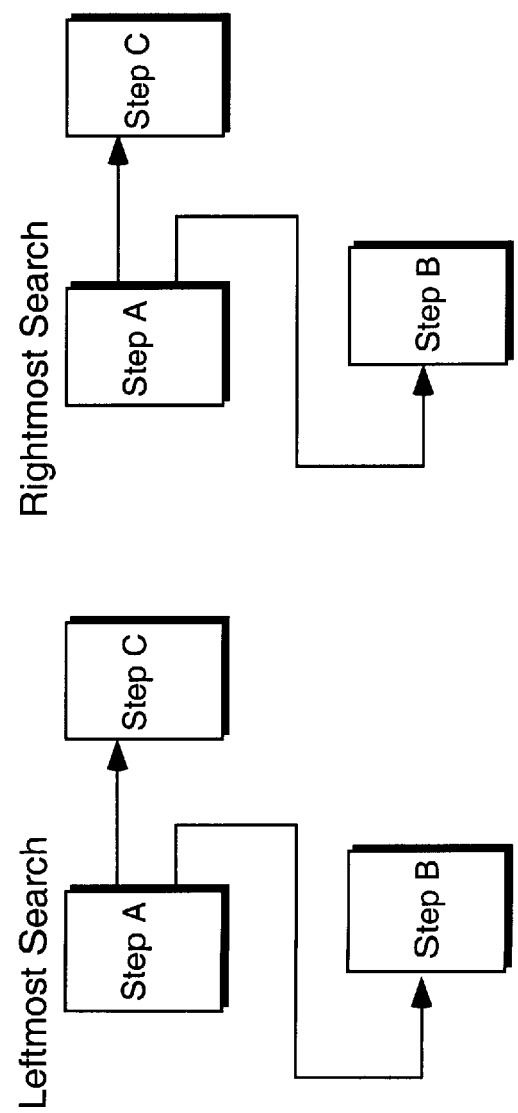

The above procedure is repeated as long as there are connections to be routed, perhaps as a result of repositioning, or until a compile-time threshold is reached. Any remaining unroutable connections are routed as a straight diagonal line from source to destination. The routing procedure is sensitive to small changes in policy, as shown in FIG. 11A and FIG. 11B. For example, looking for a vertical jog in a simple left-to-right connection may be done from the leftmost limit or the rightmost limit. The method outlined above searches from the rightmost limit in this case. A leftmost search may introduce a problem of earlier routes blocking later ones, but may be used in certain situations. As shown in FIG. 11A, a leftmost search causes the placement of the vertical jog between Step A and Step B to improperly align with the vertical jog between Step A and Step C. However, in FIG. 11B, the leftmost search produces a more desirable vertical jog location for the connection between Step A and Step B.

Support Data Structures

Searching for obstructions can be computationally expensive. These searches are optimized by the present invention using four data structures, described below.

First, an array of all groups is sorted by the topmost Y coordinate. An initial group to use for obstruction testing is determined by binary search in the array. When checking for obstructions, the group array is generally checked first since it is likely to have the smallest number of elements. This array is temporarily resorted in leftmost X when removing group overlaps.

Second, an array of all objects is sorted by the leftmost X coordinate. Again, a binary search is used to find candidates for obstruction testing. Each sorted container also keeps track of the largest X or Y of any prior object. This is used for fast searching by both smallest extent and greatest extent.

Third, a binary tree of horizontal line segments (implemented as a standard template library (STL) multi-set) is sorted on Y. A binary search is used to retrieve all candidates for obstruction testing at a given coordinate. Where possible, testing for line segment obstructions is performed last since this container is expected to have the largest number of elements.

Fourth, a binary tree of vertical line segments (implemented as an STL multi-set) is sorted on X. This is used in the same manner as above for horizontal line segments, except for vertical line segments.

Each line segment has a pointer to its logical connection. Overlaps may then be ignored when the line segments belong to the same equivalent connection. The endpoints of horizontal, vertical, and diagonal line segments are also considered obstructions.

Improving Routes

To improve the completion of all routes, some management of ordering conflicts may be added. An ordering conflict arises when a connection is routed which causes an obstruction for a later connection. This later connection may move an object that causes the earlier connection to be rerouted such that it still blocks the later connection. This situation is most likely to occur when there are several output connections on the same step.

Improvements may result from changing the order of unroutable connections for later passes, or by moving destination objects of a multiple output object more aggressively. Further aesthetic improvements are possible that minimize overlaps, particularly for connections that share tracks. This can be done as a post-routing improvement phase that swaps vertical jog locations.

Workflow Examples

Described below are several workflow examples that execute on four workflow engines.

Figure 12:
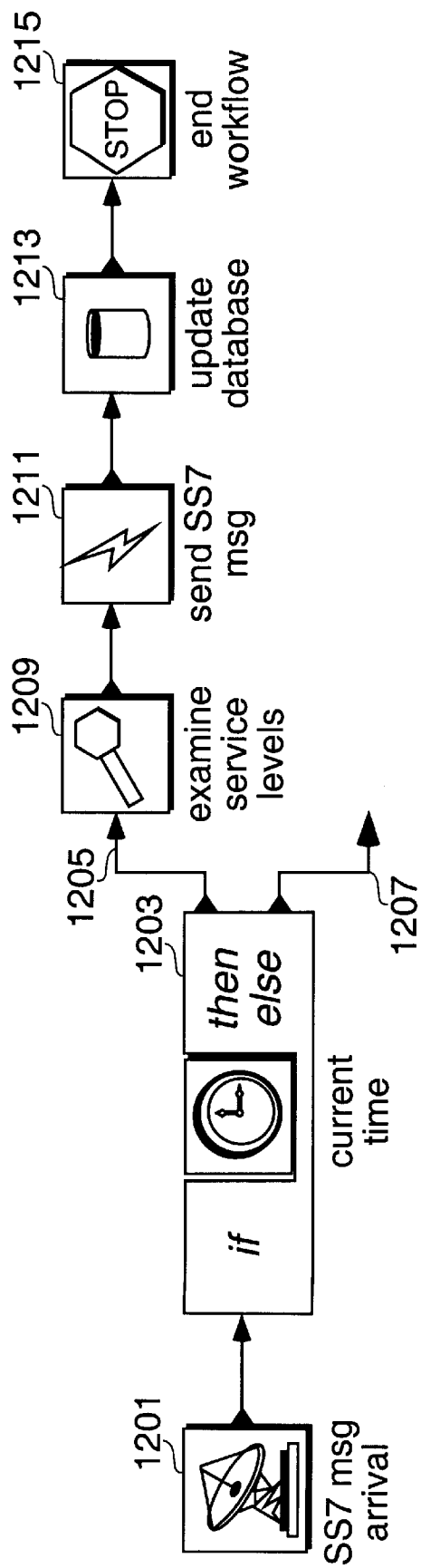
FIG. 12 is an example network prerouting workflow diagram compatible with the present invention.

A network pre-routing example is shown in FIG. 12. This workflow is triggered by an SS7 message 1201. If, at step 1203, the time is between 8 am and 6 pm on a business day, then the message is routed by service level 1205. Otherwise, the message is routed by some other criteria 1207. Examine real-time consolidated service level data from each Call Center at step 1209. At step 1211, send an SS7 response to the service control point identifying a route to the Call Center with the highest service level. Record the routing decision in a database at step 1213. Finally, terminate the workflow at step 1215. Alternatively, the workflow can return to step 1201 to await the next message arrival.

Figure 13:
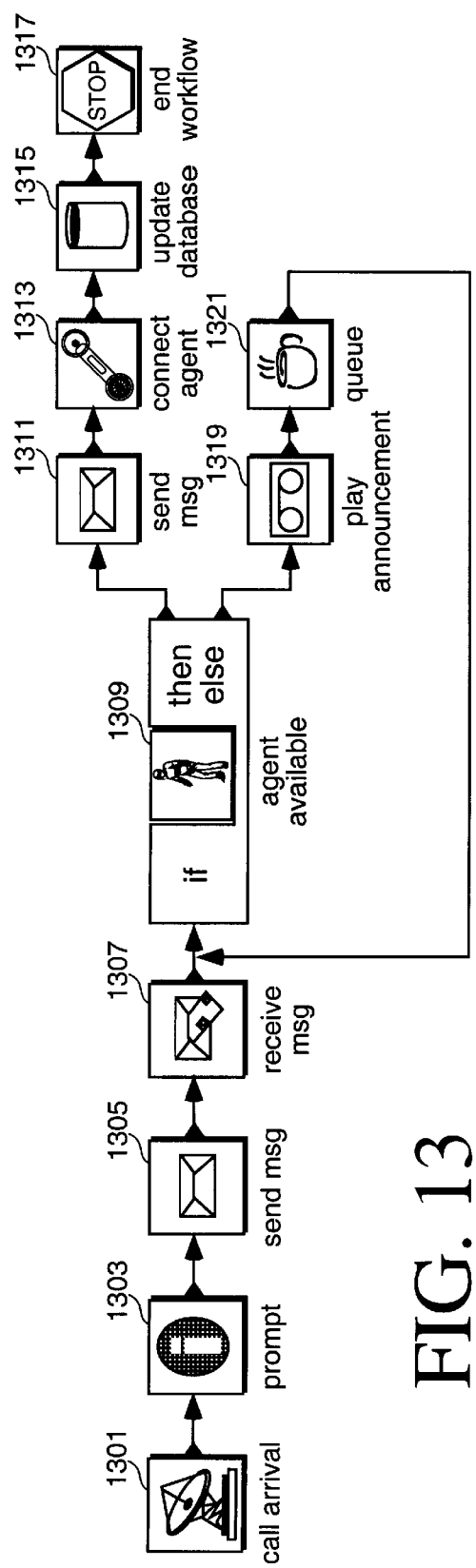
FIG. 13 is an example automatic call distribution workflow diagram compatible with the present invention.

An automatic call distribution example is shown in FIG. 13. At step 1301, the workflow is triggered by an incoming call. At step 1303, the system prompts for an account number. At step 1305, the system requests data-directed routing from a server. Step 1307 sends the account number in a message to the server and waits for response. At step 1309, a response is received from the server; the response contains an agent group number. An agent is then selected from the agent group number identified. When an agent is available, step 1311 sends the account number and the agent's phone extension to the server to request a screen pop (a display of caller information for the agent). The caller is connected to the selected agent at step 1313. Additionally, the database is updated at step 1315, and the workflow terminates at step 1317. If an agent was not available at step 1309, an announcement is played at step 1319, and the caller is placed in a queue at step 1321 until an agent is available to handle the call.

Figure 14:
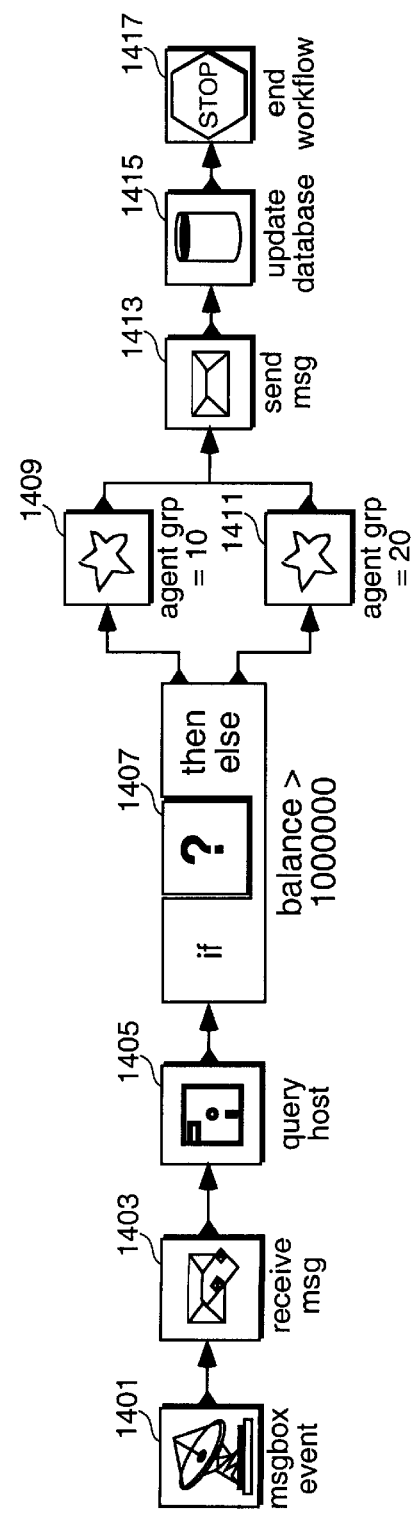
FIG. 14 is an example data-directed routing workflow diagram compatible with the present invention.

A data-directed routing example is shown in FIG. 14. At step 1401, the workflow is initiated by a message from a Call Center. At step 1403, the system retrieves an account number from the message. At step 1405, using host terminal emulation, the system requests the record corresponding to the account number. If the account balance is greater than one million dollars, then at step 1409 the agent group number is set to 10. Otherwise, at step 1411, the agent group number is set to 20. At step 1413, the account number and the agent's phone extension is sent to the server for use in a screen pop. Step 1415 returns the agent group number to the Call Center, and step 1417 terminates the workflow.

Figure 15:
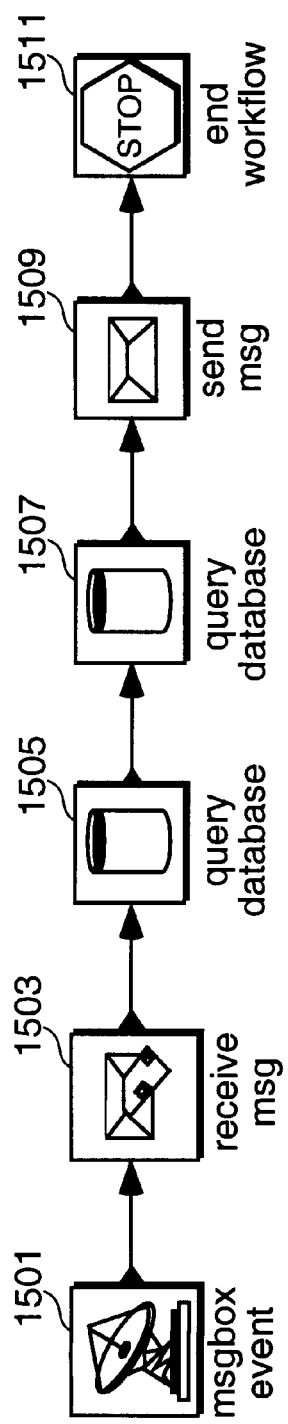
FIG. 15 is an example data retrieval workflow diagram compatible with the present invention.

A data retrieval example is shown in FIG. 15. At 1501, the workflow is initiated by a message from a Call Center. At step 1503, an account number and the agent's phone extension is retrieved from the message. At step 1505, using the account number as the primary key, the system queries a database to retrieve caller history and brokerage transaction records. Step 1507, using the agent phone extension as key, queries another database to retrieve the Internet Protocol (IP) address of the agent's PC. At step 1509, the system sends the caller history and brokerage transaction records to the IP address identified, and at step 1511 the workflow terminates.

Figure 16:
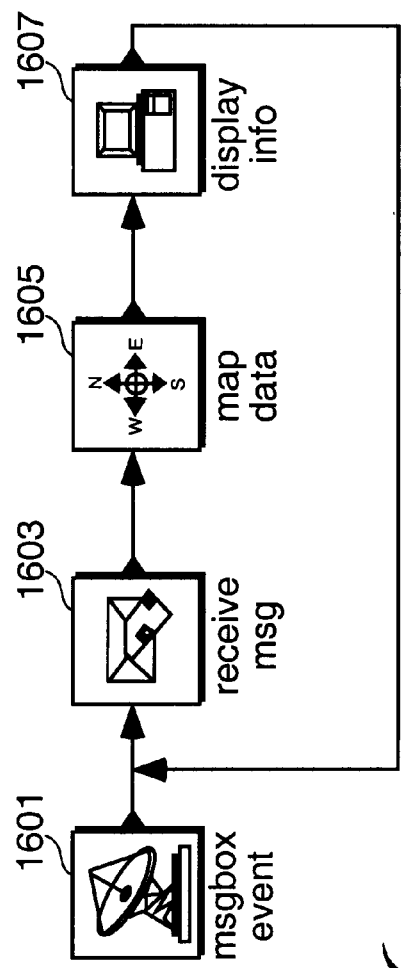
FIG. 16 is an example desktop agent workflow diagram compatible with the present invention.

A smart agent desktop example is shown in FIG. 16. At 1601, the workflow is initiated by receiving a message from the server screen pop workflow. At step 1603, the system retrieves caller history and brokerage transaction records from the message. At step 1605, the caller information is formatted into a presentation template. At step 1607, the presentation template is displayed on the agent's screen. The workflow then waits for the next message, at which point the workflow continues to step 1603.

Figure 17:
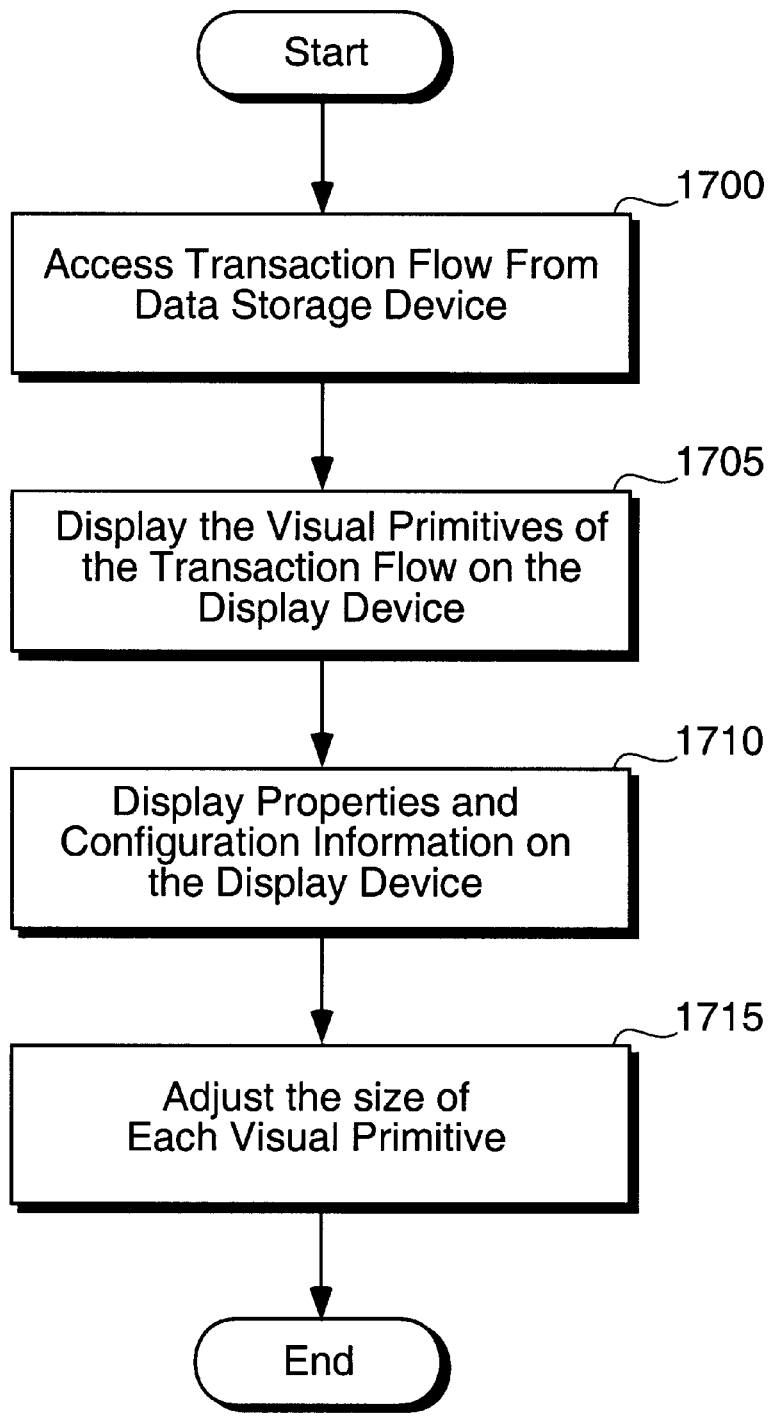
FIG. 17 is a flow diagram illustrating an embodiment of a procedure for displaying visual primitives of a transaction flow used by a transaction processing system.

FIG. 17 is a flow diagram illustrating an embodiment of a procedure for displaying visual primitives of a transaction flow used by a transaction processing system. At step 1700, the procedure accesses a transaction flow from a data storage device. The data storage device may be located on the computer system executing the procedure or may be located on a remote computer system (such as a file server). Step 1705 displays the visual primitives of the transaction flow on a display device. The display device may be any type of device capable of displaying, either permanently or temporarily, at least a portion of a transaction flow. Exemplary display devices include a video monitor and a printer. At step 1710, various properties and configuration information is displayed on the display device. These properties may be associated with a particular step in the transaction flow and may be displayed within the step itself. Alternatively, the properties may be displayed adjacent the step with which they are associated or in any other location. The configuration information may be displayed anywhere on the display device and may be associated with particular steps of the transaction flow or associated with the entire transaction flow.

At step 1715 of FIG. 17, the size of each visual primitive is adjusted based on the number of connections associated with the visual primitive and the number of properties and other information displayed within the visual primitive. For example, a visual primitive with many connections or lengthy properties may be enlarged such that all connections fit on the visual primitive and all properties are visible within the visual primitive. Thus, each visual primitive is adjusted to the minimum size required to show all connections and all property information. In one embodiment of the invention, the size of each visual primitive "snaps" to a snap grid, thereby providing a limited number of visual primitive sizes. Although steps 1705, 1710, and 1715 of FIG. 17 are illustrated as sequential steps, in particular embodiments of the invention, the steps may be performed in a different order or may be performed simultaneously. Additionally, any of steps 1705, 1710, and 1715 may be repeated if any changes are made to the transaction flow.

While the invention is described in terms of preferred embodiments in a specific system environment, those of ordinary skill in the art will recognize that the invention can be practiced, with modification, in other and different hardware and software environments within the spirit and scope of the appended claims.

What is claimed is:

1. A method for displaying visual primitives of a workflow used by a customer interaction system, the method using a digital computer having a visual display and a data storage device, the method comprising:

accessing the workflow from the data storage device, wherein the workflow comprises a plurality of operations to be performed in sequence, the plurality operations being represented by an associated plurality of visual primitives;

displaying the plurality of visual primitives representing the plurality of operations of the workflow using the visual display; and facilitating unrestricted placement of each of the plurality of visual primitives relative to other visual primitives of the plurality of visual primitives so that the sequence in which the plurality of operations is to be performed is unrelated to relative positioning of the plurality of visual primitives, wherein the sequence in which the plurality of operations is to be performed is specified by visual connectors displayed connecting the plurality of visual primitives and wherein the displaying includes displaying properties of the plurality of visual primitives using the visual display.

2. The method of claim 1 further including grouping the plurality of visual primitives of the workflow into sets.

3. The method of claim 2 wherein the sets include any one of a group comprising an electronic mail application set, an Internet application set and an automated call distribution (ACD) set.

4. The method of claim 2 wherein the sets include dynamic and extensible sets.

5. The method of claim 1 further including dynamically sizing at least one of the plurality of the visual primitives.

6. The method of claim 5 wherein the at least one visual primitive is dynamically resized to closely accommodate text included within the at least one visual primitive.

7. The method of claim 1 further including displaying workflow configuration information using the visual display.

8. The method of claim 1 wherein the plurality of visual primitives are organized into a plurality of libraries.

9. The method of claim 1 wherein the workflow is associated with multiple transaction processing systems.

10. The method of claim 1 wherein the customer interaction system is a telephone call processing system.

11. The method of claim 1 wherein each of the visual primitives includes at least one connection point, and the visual connectors extend between respective connection points of connected visual primitives.

12. An apparatus for displaying visual primitives of a workflow used by a customer interaction system, the apparatus comprising:

a digital computer;

a visual display coupled to the digital computer and to display the workflow wherein the workflow comprises a plurality of sequential actions, each sequential action is represented by an associated visual primitive and the workflow is displayed utilizing a sequence of visual primitives;

a data storage device coupled to the digital computer and configured to store the workflow in an electronic format; and a workflow display mechanism operated by the digital computer and coupled to the data storage device and the visual display, wherein workflow display mechanism is to access the workflow and to facilitate unrestricted placement of each of the visual primitives of the sequence of visual primitives relative to each other so that a sequence of the plurality of sequential actions is unrelated to the relative positioning of the visual primitives of the sequence of visual primitives and so that the sequence of the plurality of sequential actions is specified by visual connectors displayed connecting the sequence of visual primitives and wherein the display mechanism is to display properties of the visual primitives.

13. The apparatus of claim 12 further including a user input device, coupled to the digital computer, to allow entry of information.

14. The apparatus of claim 12 further including a pointing device, coupled to the digital computer, to move a virtual pointer on the visual display in response to movement of the pointing device.

15. The apparatus of claim 12 wherein the workflow display mechanism further includes a mechanism to group elements of the workflow into sets.

16. The apparatus of claim 15 wherein the sets include dynamic and extensible sets.

17. The apparatus of claim 15 wherein the sets include any one of a group comprising an electronic mail application set, an Internet application set and an automated call distribution (ACD) set.

18. The apparatus of claim 12 wherein the workflow display mechanism further includes a mechanism to dynamically size at least one of the visual primitives.

19. The apparatus of claim 18 wherein the at least one visual primitive is dynamically sized to closely accommodate text included within the at least one visual primitive.

20. The apparatus of claim 12 wherein the workflow display mechanism further includes a mechanism to display workflow configuration information using the visual display.

21. The apparatus of claim 12 wherein each of the visual primitives includes at least one connection point and the visual connectors extend between respective connection points of connected visual primitives.

22. An apparatus for displaying visual primitives of a workflow used by a customer interaction system, the apparatus comprising:

a digital computer;

means coupled to the digital computer for displaying the workflow wherein the workflow comprises a plurality of sequential steps, each sequential step is represented by an associated visual primitive and the workflow is displayed utilizing a sequence of visual primitives;

means coupled to the digital computer for storing the workflow in an electronic format; and means for accessing the workflow and displaying the workflow on the display means, wherein the means for accessing the workflow and displaying the workflow is operated by the digital computer and coupled to the storing means and the display means, and wherein the means for accessing the workflow and displaying the workflow provides for unrestricted placement of each of the visual primitives of the sequence of visual primitives relative to each other so that a sequence of the plurality of sequential steps is unrelated to the relative positioning of the visual primitives of the sequence of visual primitives and so that the sequence of the plurality of sequential steps is specified by visual connectors displayed connecting the sequence of visual primitives, wherein the means for accessing the workflow and displaying the workflow further includes means for displaying properties of the visual primitives using the display means.

23. The apparatus of claim 22 wherein the means for accessing the workflow and displaying the workflow further includes means for grouping visual primitives of the workflow into sets.

24. The apparatus of claim 22 wherein the means for accessing the workflow and displaying the workflow further includes means for dynamically sizing the visual primitives.

25. The apparatus of claim 22 wherein the means for accessing the workflow and displaying the workflow further includes means for displaying workflow configuration information using the display means.

26. A computer software product including a medium readable by a processor, the medium having stored thereon a sequence of instructions which, when executed by the processor, cause the processor to perform a method of displaying a visual primitives of a workflow utilized by a customer interaction system, the method using a digital computer having a visual display and a data storage device and including:

accessing a workflow from the data storage device coupled to the processor, wherein the workflow comprises a plurality of steps to be performed in sequence, the plurality of steps being represented by an associated plurality of visual primitives;

displaying the plurality of visual primitives representing the plurality of steps of the workflow using the visual display coupled to the processor, wherein the computer software product provides for unrestricted placement of each of the plurality of visual primitives relative to other visual primitives of the plurality of visual primitives so that the sequence in which the plurality of steps is to be performed is unrelated to the relative positioning of the plurality of visual primitives and wherein the sequence in which the plurality of steps is to be performed is specified by visual connectors displayed connecting the plurality of visual primitives, the computer software product further including instructions which, when executed by the processor, cause the processor to display properties of the visual primitives using the visual display.

27. The computer software product of claim 26 further including instructions which, when executed by the processor, cause the processor to group visual primitives of the workflow into sets.

28. The computer software product of claim 26 further including instructions which, when executed by the processor, cause the processor to dynamically size the visual primitives.

29. The computer software product of claim 26 further including instructions which, when executed by the processor, cause the processor to display workflow configuration information using the visual display.

* * * * *